(12) United States Patent
Wheeler

(10) Patent No.: US 8,016,909 B2
(45) Date of Patent: Sep. 13, 2011

(54) PROCESS FOR PRODUCING METAL FLAKES

(75) Inventor: Ian Robert Wheeler, By Kinross (GB)

(73) Assignee: Dunwilco (1198) Limited, Edinburgh (GB)

( * ) Notice: Subject to any disclaimer, the term of this patent is extended or adjusted under 35 U.S.C. 154(b) by 459 days.

(21) Appl. No.: 11/990,077

(22) PCT Filed: Aug. 12, 2005

(86) PCT No.: PCT/GB2005/003168
§ 371 (c)(1),
(2), (4) Date: Feb. 13, 2008

(87) PCT Pub. No.: WO2007/020364
PCT Pub. Date: Feb. 22, 2007

(65) Prior Publication Data
US 2010/0167079 A1    Jul. 1, 2010

(51) Int. Cl.
*B22F 9/06* (2006.01)
*B32B 5/16* (2006.01)

(52) U.S. Cl. .......... 75/331; 428/567

(58) Field of Classification Search .......... 75/331; 428/567
See application file for complete search history.

(56) References Cited

U.S. PATENT DOCUMENTS

| | | |
|---|---|---|
| 1,306,060 A | 6/1919 | Hall |
| 4,063,942 A | 12/1977 | Lundgren |
| 4,115,107 A | 9/1978 | Booz et al. |
| 4,116,710 A | 9/1978 | Heikel |
| 4,154,284 A | 5/1979 | Maringer |
| 4,172,720 A | 10/1979 | Megelas |
| 4,318,747 A | 3/1982 | Ishijima et al. |
| 4,434,010 A | 2/1984 | Ash |
| 4,676,838 A | 6/1987 | Franz et al. |
| 4,687,510 A * | 8/1987 | Cheney et al. ............ 75/331 |
| 4,879,140 A | 11/1989 | Gray et al. |
| 4,882,133 A | 11/1989 | Saegusa |
| 4,915,729 A | 4/1990 | Boswell et al. |
| 5,100,599 A | 3/1992 | Gurnick et al. |
| 5,259,861 A | 11/1993 | Yeh et al. |
| 5,266,098 A | 11/1993 | Chun et al. |
| 5,332,198 A | 7/1994 | Yeh et al. |
| 5,336,312 A | 8/1994 | Byrne et al. |
| 5,560,543 A | 10/1996 | Smith et al. |
| 5,593,773 A | 1/1997 | McKay et al. |
| 5,598,200 A | 1/1997 | Gore |
| 5,672,410 A | 9/1997 | Miekka et al. |
| 5,702,519 A | 12/1997 | Nitta et al. |
| 5,810,988 A | 9/1998 | Smith, Jr. et al. |
| 6,074,754 A | 6/2000 | Jacobsen et al. |
| 6,270,841 B1 | 8/2001 | Mikhael et al. |
| 6,317,947 B1 | 11/2001 | Ruschmann |
| 6,376,018 B1 | 4/2002 | Kittler, Jr. |
| 6,547,869 B2 | 4/2003 | Witt |
| 6,643,001 B1 | 11/2003 | Faris |
| 6,863,851 B2 | 3/2005 | Josephy et al. |
| 6,997,982 B2 | 2/2006 | Pfaff et al. |
| 2002/0005144 A1 | 1/2002 | Chattopadhyay et al. |
| 2003/0075079 A1 | 4/2003 | Sommer |
| 2003/0085380 A1 | 5/2003 | Schuhmacher et al. |
| 2003/0186485 A1 | 10/2003 | Farrar et al. |
| 2004/0139820 A1 | 7/2004 | Kodas et al. |
| 2004/0146642 A1 | 7/2004 | Josephy et al. |
| 2004/0149959 A1 | 8/2004 | Mikhael et al. |
| 2004/0166340 A1 | 8/2004 | Cairns et al. |
| 2004/0244675 A1 | 12/2004 | Kishimoto et al. |
| 2004/0261661 A1 | 12/2004 | Sommer |
| 2005/0024626 A1 | 2/2005 | Faris |
| 2005/0252410 A1 | 11/2005 | Bujard et al. |
| 2007/0240619 A1 | 10/2007 | Munchow |
| 2008/0102269 A1 | 5/2008 | Herzing et al. |
| 2009/0107293 A1 | 4/2009 | Bujard et al. |
| 2009/0133605 A1 | 5/2009 | Butler et al. |
| 2010/0180800 A1 | 7/2010 | Munchow |
| 2010/0194836 A1 | 8/2010 | Prolss et al. |
| 2010/0297045 A1 | 11/2010 | Kaupp et al. |

FOREIGN PATENT DOCUMENTS

| | | |
|---|---|---|
| DE | 2 007 717 | 9/1971 |
| DE | 2 127 563 | 12/1972 |
| EP | 0 134 676 A1 | 3/1985 |
| EP | 0 370 701 A1 | 5/1990 |
| EP | 0 651 777 B1 | 12/1996 |
| EP | 0 916 703 A2 | 5/1999 |
| EP | 1 142 962 | 10/2001 |
| EP | 1 266 977 A2 | 12/2002 |
| GB | 519 624 | 4/1940 |
| GB | 2 228 372 A | 8/1990 |
| GB | 1 465 908 | 3/1997 |
| GB | 1 373 790 | 11/1997 |
| GB | 2 326 647 A | 12/1998 |
| GB | 2 339 800 A | 2/2000 |
| JP | 57-111239 | 10/1982 |

(Continued)

OTHER PUBLICATIONS

Rawle, "Basic Principles of Particle Size Analysis", Technical Paper, Malvern Instruments Limited.

(Continued)

*Primary Examiner* — Roy King
*Assistant Examiner* — Jie Yang
(74) *Attorney, Agent, or Firm* — Nixon & Vanderhye P.C.

(57) ABSTRACT

The present invention provides a jetting process for the production of flakes with uniform size distribution to be used in pigments comprising the steps of ejecting molten metal from a jet head and collecting droplets of metal on a solid collecting substrate or collecting droplets of metal in or on a collecting substrate.

39 Claims, No Drawings

FOREIGN PATENT DOCUMENTS

| | | |
|---|---|---|
| JP | 60-155607 | 8/1985 |
| JP | 04-39362 | 2/1992 |
| JP | 11-199795 | 7/1999 |
| JP | 3072527 | 6/2000 |
| WO | WO 93/08237 | 4/1993 |
| WO | WO 97/43346 | 11/1997 |
| WO | WO 99/57204 | 11/1999 |
| WO | WO 01/25500 A1 | 4/2001 |
| WO | 02/31058 A1 | 4/2002 |
| WO | WO 02/072683 A1 | 9/2002 |
| WO | WO 03/068868 A2 | 8/2003 |
| WO | WO 03/106569 A1 | 12/2003 |
| WO | 2004/012886 | 2/2004 |
| WO | 2004/070733 A2 | 8/2004 |
| WO | WO 2004/068389 A2 | 8/2004 |
| WO | WO 2005/017048 A2 | 2/2005 |
| WO | 2006/069663 A2 | 7/2006 |
| WO | WO 2006/082415 A2 | 8/2006 |
| WO | WO 2007/020448 A2 | 2/2007 |
| WO | 2007/137438 A1 | 12/2007 |

OTHER PUBLICATIONS

Barron et al, "Investigation of Processing Parameters of Spray Freezing into Liquid to Prepare Polyethylene Glycol Polymeric Particles for Drug Delivery", Submitted Nov. 20, 2002; Accepted: Feb. 28, 2003, AAPS PharmSciTech 2003; 4 (2) Article 12.

Abstract of Genovese et al, Journal of Food Process Engineering, vol. 23, Issue 6, pp. 437-452, published on-line Jan. 30, 2007.

Thermo Anderson product specification for the DataRAM 4TM—Model DR-4000.

A 3 page declaration from Mr. Ian Wheeler dated Apr. 16, 2009.

A 2 page declaration from Mr. Ian Wheeler dated Apr. 22, 2009.

Slides from a 2007 webinar by Dr. Alan Rawle.

Dr. Alf Smith, General Vacuum Equipment, High Volume Roll to Roll Vacuum Processes (Evaporation, Sputtering and Plasma CVD) UKDN Walton Hall, Jan. 10-11, 2006.

Printouts from Bobstgroup.com (re "GENERAL").

A presentation by Xennia.

Wehl et al, 14th European Microelectronics and Packaging Conference & Exhibition, Friedrichshafen, Germany, Jun. 23-25, 2003.

Kim et al, Recent Progress in Droplet-Based Manufacturing Research.

Electronics/Computer Hardware/Communications, Microfab Technologies, Inc., Using Solder-jet Technology to Attach Semiconductor Chips to Circuit Board.

Eur. Coat. J., Apr. 1999, pp. 90-96.

U.S. Appl. No. 11/883,342, filed Sep. 11, 2007.

U.S. Appl. No. 11/990,526, filed Feb. 15, 2008.

Attinger et al, "An Experimental Study of Molten Microdroplet Surface Deposition and Solidification: Transient Behavior and Wetting Angle Dynamics", Journal of Heat Transfer, vol. 122, Aug. 2000, pp. 544-556.

"The Uniform Droplet Spray (UDS) Process Enables Efficient Production of Mono-Size Powder and Sheet of Engineering Alloys", Project Fact Sheet, Advanced Industrial Materials Program; U.S. Dept. of Energy, Feb. 1999.

* cited by examiner

PROCESS FOR PRODUCING METAL FLAKES

This application is the U.S. national phase of International Application No. PCT/GB2005/003168, filed 12 Aug. 2005, the entire contents of each of which are hereby incorporated by reference.

The present invention relates to a jetting process. The present invention further relates to flattened metal particulates, processes for their production and their use, especially as functional fillers and pigments.

The term atomised metal powders is used in the industry to imply somewhat spherical particulates. They are thereby distinguished from flattened metal particulates, especially those flattened metal particulates of the metal pigment industry, which are generally referred to as flakes.

Amongst metal flakes, aluminium and gold bronze (an alloy of copper and zinc) are the most widely manufactured, but copper, gold, iron, nickel, silver, stainless steel, tin, and zinc flakes are all commercially available. Applications of aluminium and gold bronze pigments are mainly for silver or gold coloration respectively of paints, inks, powder coatings and plastics. These and copper, gold, iron, nickel, silver, stainless steel, tin, and zinc metal flakes may also have functional properties, such as electrical conductivity, heat and light reflection, moisture barrier or flame retardancy.

The preparation of metal flake pigments from conventionally atomised metal powders is well documented in the patent literature. Such pigments may be prepared in the complete absence of solvent by a dry ball milling process, but this can be hazardous in the case of reactive metals such as aluminium, due to the contaminating and/or explosive properties of the dry flake products. For such metals, dry milling has been largely superseded by wet ball milling processes in which metal powder is milled with an organic liquid such as mineral spirits and a small amount of a lubricant. The cascading action of grinding media within the ball mill causes the substantially spherical metal powder to be flattened out into flakes having aspect ratios (the ratio of the largest dimension to the smallest) of from about 15:1 to around 150:1 or even up to 250:1 and beyond. The function of the lubricant is to prevent the cold welding of adjacent flakes that can occur under the impact of grinding media.

Older production processes produce flakes with angular edges and uneven surfaces, known in the art as "cornflakes". A more recent development relating to aluminium is so-called "silver dollar" flakes. These are distinguished by more rounded edges, smoother, flatter surfaces and often a narrower particle size distribution. In consequence they have brighter, whiter and more desirable appearance than cornflakes.

Irrespective of the method of milling, the most common starting material is atomised metal powder. Atomised metal powders are prepared by melting the bulk metal then continuously forcing it through a nozzle by means of highly compressed gas. In this way, bulk metal is converted to a plurality of fine powder particles, whose shape, median particle diameter and particle size distribution are determined by such factors as metal type, atomising temperature and the compressed gas type and pressure. Atomisation processes have been known for many years. For example, an early apparatus is described in U.S. Pat. No. 1,306,060. The nature of the gas used greatly influences the geometry and surface finish of the derived powder. Thus air atomisation results in powder having both irregular shape and surface, whereas an inert gas such as argon or nitrogen provides substantially spherical powder with a smoother surface.

Such atomising processes share two common features. Firstly, it is technically difficult to produce high yields of metal powders with median particle diameters less than about 10 μm. Such fine powders are particularly sought after for powder metallurgy, rocket propellants and for the production of metal flake pigments of high hiding power (opacity). In practice, this fine particle size fraction, which may account for no more than 20% of the atomised material, is separated from coarser powder by sieving or centrifugal classification. In the case of some reactive metals, such as aluminium, this operation must be conducted in an inert atmosphere, to avoid the possibility of explosion.

The second characteristic exhibited by conventional atomisation processes is the generation of powder with a wide particle size distribution. A typical distribution is shown in Table 1, which illustrates a commercially available aluminium powder with a median particle diameter ($D_{50}$) of 39.63 μm, a $D_{10}$ of 14.41 μm and a $D_{90}$ of 80.78 μm. Thus the span, defined as the $D_{90}$ less the $D_{10}$, thereafter divided by the $D_{50}$, is 1.67, characterises this typically broad particle size distribution.

The twin limitations of fine powder production and wide particle size distribution have a consequential limiting effect on the characteristics of metal flakes prepared from atomised powders.

Narrow particle size distribution is a highly desirable characteristic of metal flake pigments. Excessively fine flakes, such as those having a diameter of up to about 2 μm, have increased opacity or hiding power, but are substantially less brilliant than larger flakes. Coarser flakes, for example those with a diameter over 30 μm, may exhibit an undesirable degree of sparkle in modern coatings, in which a smooth visual effect is desired. Large flakes have substantially reduced opacity and can also cause problems in application. For example, when used in inks, they may block the cells of gravure printing presses.

To obtain a narrow particle size distribution, it is customary to subject the products of milling to size segregation procedures, such as dry or wet screening, to separate the desired particle size range from excessively large and/or small flakes. In this way a brighter, smoother and more desirable metallic appearance is obtained. Such a size segregation process adds to the cost of the desired product, as the removed material may have either no, or limited commercial use. In practice, oversize material is often returned to the milling apparatus, to be further ground down into the desired particle size range.

U.S. Pat. No. 5,266,098 describes a process for making uniformly sized metal droplets. The process uses a container capable of holding molten metal with at least one orifice where this metal can be ejected, along with a vibrating mechanism and pressure to force the molten metal through the orifice, and a means of providing an electrical charge on the droplets so formed. The cooled droplets have a uniform size, varying by only about ±25% from the average.

Means to prepare fine metal powders of narrow particle size distribution are described in, for example U.S. Pat. No. 5,810,988. This describes a jetting apparatus to produce and collect uniformly-sized, metal droplets, comprising a droplet generator, disposed to emit molten metal droplets in a generally upward direction to cause emitted droplets to travel a parabolic path, during which they are cooled without deformation to form substantially spherical solid metal droplets. That invention further provides a jet control system to electromechanically generate a stream of the molten droplets by either continuous or drop-on-demand (DOD) methods. Envisaged applications for the solid metal droplets include soldering of printed circuit boards, deposition of microcircuits and patterns, mask making, circuit board repairs and fabrication of microwave circuit components.

In US Patent Application 2003/186485A1 there is described a jet apparatus consisting of a head having a plurality of ejection ports, each of which is associated with a gas ejection conduit connected to a chamber in which hydrogen gas may be instantaneously generated by a chemical reaction. This gas provides the pressure to eject molten metal from the ejection ports. The invention is directed to preparation of solder bumps on semiconductor dies.

There is a need for a metal powder that has both a low median particle diameter and a narrow particle size distribution. By using such a powder in the preparation of metal flake pigments, a substantially monodisperse metal flake pigment product may be obtained in virtually 100% yield, i.e. without the necessity of removing over-sized and/or under-sized flakes for re-milling or recycling. Both the economics of such a process and the colouristic attractiveness of such a product are considerable.

As described above the most common starting material in the preparation of metal flakes is atomised metal powder. This is prepared by melting the bulk metal then forcing it through a nozzle by means of compressed gas. Thus bulk metal is converted to powder only to be further worked mechanically in the ball mill to form flakes. There therefore exists the need for a process that converts bulk metal directly to flakes.

DISCLOSURE OF THE INVENTION

Process

In a broad aspect, the present invention provides a jetting process comprising the steps of ejecting molten metal from a jet head and either (a) collecting droplets of metal on a collecting substrate, wherein the collecting substrate comprises a solid release layer; or (b) collecting droplets of metal in or on a collecting substrate and subsequently milling the collected metal droplets.

The term "release layer" means a material to which the droplets of metal do not become permanently attached. This allows the droplets of metal to be detached from the release layer for example by mechanical means or by washing the release layer with a suitable recovery liquid. The term "solid release layer" means a release layer that is sufficiently solid to cause at least some degree of deformation to the metal droplets.

In a further broad aspect, the present invention provides a process of preparing flattened metal particulates, the process comprising the steps of ejecting molten metal from a jet head and either (a) collecting droplets of metal in the form of metal flakes on a collecting substrate, wherein the collecting substrate comprises a solid release layer; or (b) collecting droplets of metal in the form of metal particulates in or on a collecting substrate; and subsequently treating the metal particulates to provide flattened metal particulates.

The term "flattened metal particulate" refers to metal particles which are not spherical, i.e. which have an aspect ratio of at least 1.1:1 wherein the aspect ratio is defined as the ratio of the largest dimension to the smallest dimension. In one preferred aspect the flattened metal particulates have aspect ratios of at least 1.5:1. Metal flakes are a particularly preferred type of flattened metal particulate.

The term "metal flake" as used herein refers to a metal particle having an aspect ratio of at least 5:1. According to a preferred aspect of the invention the metal flakes are substantially cylindrical and the aspect ratio is then the ratio of the diameter to the height.

In process (b) of the invention, the metal particulates may be treated by one of the processes described in U.S. Pat. No. 5,593,773 to form flattened metal particulates. These processes include ball milling at low ball collision energies for example by slow speed ball milling with a low ball charge, or by increasing the viscosity of the mill base in the ball milling regime appropriate to conventional flake formation. In this embodiment the flattened metal particulates can be regarded as slightly distorted, or facetted, spheres which have a greater surface area and hence reflectivity than the untreated metal spheres from which they are produced. U.S. Pat. No. 5,593,773 is herein incorporated by reference.

In a preferred embodiment, in process (b) of the invention, the metal particulates are milled to provide metal flakes.

Thus in one aspect the present invention also provides a process of preparing metal flakes, the process comprising the steps of ejecting molten metal from a jet head and either: (a) collecting droplets of metal in the form of metal flakes on a collecting substrate, wherein the collecting substrate comprises a solid release layer; or (b) collecting droplets of metal in the form of metal particulates in or on a collecting substrate; and subsequently milling the metal particulates to provide metal flakes.

In one aspect the present invention provides a process for preparing metal flakes directly from the bulk metal, thereby avoiding the expensive conventional steps of atomised powder preparation followed by ball milling.

In another aspect, the present invention provides a process for preparing metal flakes of narrow particle size distribution from substantially spherical metal particulates of much narrower particle size distribution than are obtainable by conventional atomisation techniques.

The metal may be melted in any crucible or reservoir recognised for the purpose, providing that there is good thermal control.

Preferably the molten metal is supplied to the jet head from a reservoir. A short path from the crucible or reservoir to the jet head containing the nozzle plate and nozzles is desirable. This is to avoid excessive cooling of the mass prior to entering the nozzle, which could lead to blockage thereof.

The mechanism by which the jet head ejects molten metal is not critical, providing sufficiently small droplets can be uniformly generated at high speed and the materials of construction are capable of withstanding the melt temperature of the metal in use. In a preferred aspect of the present process, the molten metal is ejected vertically downwards.

Jet heads of the continuous ink jet (CIJ) and drop-on-demand (DOD) types are especially amenable to the process of the invention, provided that the piezoelectric control of the latter is kept well insulated and so well below the temperature of the molten metal. Those jet heads operating via piezoelectrically controlled nozzle elements are generally suitable for metals and alloys melting below the Curie point. Above the Curie temperature, the piezoelectric mechanism becomes inoperative. The Curie temperature for one of the commonest piezoelectric materials, lead zirconium titanate (PZT), is around 350° C.

An effective control mechanism is essential for the production of uniform droplets. Inducing droplets to part reliably and uniformly on egress from the nozzle entrance may be achieved via a number of mechanisms. These include, but are not limited to, pulsed RF heating, pulsed laser heating, acoustic standing waves and electrically induced heating of the metal itself, based on its inherent resistance. Not all techniques will be applicable to all metals, but the optimum mechanism may readily be determined by experiment.

Design of the nozzle plate and its nozzles is a further important parameter in controlling the nature and uniformity of the droplets. In practice, a nozzle plate will accommodate a plurality of nozzles; perhaps several hundred. In this way, blockage of a few nozzles does not critically impair overall performance. A plurality of nozzles is desirable in order to prepare commercial quantities in a reasonable timescale.

Nozzle orifices may have a circular section, or may be of other geometries. Diameters may range from 2 µm to 100 µm or more, depending on the desired metal flake size. It has been found that small diameter silicon wafers are effective materials for nozzle plates, being of good chemical resistance and durable if well supported. Laser drilled ruby crystals have also been successfully employed. The relationship between nozzle dimensions and droplet size depends on the many operating parameters, but a droplet diameter range of up to 3 times the smallest nozzle dimension is generally found.

A filter for the molten metal before it enters the nozzles is also advantageous. Filtration of the molten metal is recommended to prevent nozzle blockages which may occur, for example, if there are impurities such as oxide or slag, in the molten metal.

Filtration may be achieved by any filters routinely employed for molten metals. The pore size of the filter is however desirably a maximum of half the nominal nozzle diameter. In practice, it has been found satisfactory to install a series of filters of successive fineness whereby the filter that has a maximum of half the nominal nozzle diameter is the last to be encountered before the molten metal reaches the nozzle. Ceramic filters of pore sizes down to 5 µm have been advantageously used.

The metal is preferably selected from aluminium, zinc, copper, tin, nickel, silver, gold, iron and alloys thereof such as gold bronze, an alloy of copper and zinc, alloys of tin with aluminium, gallium and/or indium, or stainless steel, an alloy composed mainly of iron. More preferably, the metal is selected from aluminium, zinc, copper, tin, nickel, silver and alloys thereof such as gold bronze. In one aspect, aluminium, copper, tin, silver and alloys thereof are particularly preferred. In another aspect aluminium, tin and gold bronze are particularly preferred. In a further aspect, aluminium and gold bronze are particularly preferred.

In order to prevent oxidation of the more reactive metals and the possible formation of oxide slags and also to reduce explosiveness, the process of the invention may advantageously be carried out under an inert gas atmosphere.

According to one aspect of the invention, the jet head and the collecting substrate are in a chamber under an inert atmosphere, or under at least a partial vacuum.

The inert atmosphere is preferably provided by an inert gas such as nitrogen. Use of an inert gas or at least a partial vacuum is advantageous because it limits or avoids oxidation of the molten metal, the metal flakes and/or the metal particulates. In an alternative embodiment the chamber could be filled with air.

In one preferred aspect the gas in the chamber is chilled. In another preferred aspect the gas is directed vertically upwards. These preferred aspects may advantageously be used to limit the height of the chamber required.

An elevated pressure applied to the crucible containing the molten metal, and/or a vacuum applied to the nozzle discharge side of the apparatus may also aid reliable ejection from the nozzles.

Process (a)

According to a first embodiment the present invention provides a process of preparing metal flakes, the process comprising the steps of ejecting molten metal from a jet head and collecting droplets of metal in the form of metal flakes on a collecting substrate, wherein the collecting substrate comprises a solid release layer.

This embodiment may advantageously be used to prepare metal flakes directly from the bulk metal without the need to convert the bulk metal to a powder which then needs to be further worked mechanically to form flakes.

The metal flakes generally have a substantially circular face but may be different shapes depending on the intended application. For example the metal flakes may have a substantially triangular, square, rectangular or star-shaped face or may be rod-like or fibre-like.

Circular shapes may be obtained from single droplets whereas other shapes are obtained by directing two or more droplets onto the collecting substrate such that the second and subsequent droplets impinge partially on earlier droplets and fuse therewith. The thickness and surface characteristics of the metal flakes may be controlled by adjusting the contact angle and surface tension relationship between the molten metal and the collecting substrate material. The optimum operating conditions for a given combination of metal and collecting substrate may be determined by routine experimentation.

Rapid cooling takes place as the droplet of metal leaves the jet head and impinges on the collecting substrate. According to process (a) of the present invention, the distance between the jet head and the collecting substrate is selected such that the droplets of metal remain sufficiently fluid at the point of impact with the substrate to form metal flakes. Various factors need to be taken into account in order to select an appropriate distance. These factors include the nature of the metal, the molten metal temperature in relation to its melting point, the droplet size, the collecting substrate temperature and the atmospheric temperature in the region of the jet head.

Preferably the distance between the jet head and the collecting substrate in process (a) is less than 0.30 metres, such as less than 0.25 metres or less than 0.20 metres. More preferably the distance between the jet head and the collecting substrate in process (a) is from 0.001 to 0.01 metres.

Thus, preferably this first embodiment provides a process of preparing metal flakes, the process comprising the steps of ejecting molten metal from a jet head and collecting droplets of metal in the form of metal flakes on a collecting substrate, wherein the collecting substrate comprises a solid release layer and wherein the distance between the jet head and the collecting substrate is less than 0.25 metres.

In one aspect the solid release layer has a low friction coefficient. This property is advantageous because it allows the metal flakes to be readily removed from the solid release layer. Solid release layers having a low friction coefficient include polytetrafluoroethylene (PTFE) and silicon. Alternative solid release layers include polished glass or polished ceramic.

The solid release layer should be made of a material that is able to withstand the temperature of the metal droplets at the instant of contact. The distance between the jet head nozzle and the solid release layer will affect the temperature of the metal droplets at the instant of contact and hence the suitability of a particular solid release layer. The thermal limitations of PTFE will typically restrict its suitability to metals and alloys having low melting points.

One example of a release layer is a layer of organic or inorganic, solvent soluble or solvent dispersible material which is coated onto a substrate, generally as a solvent solution. The solvent is subsequently removed therefrom, for example by evaporation. Metal flakes which are deposited onto such a release layer may be subsequently removed therefrom by redissolution or redispersion of the release layer in the same or another solvent. The thermal limitations of such release layers may restrict their suitability to metals and alloys having low melting points.

In one preferred aspect the solid release layer is a continuous belt or is on a continuous belt. For example the solid release layer may be accommodated on a continuous belt by division into strips. Preferably the solid release layer is kept in motion to control the spatial disposition of the metal flakes and in this aspect a continuous belt is particularly advantageous. A continuous belt also allows the metal flakes to be released from the solid release layer downstream of the jet head nozzles. When the metal droplets are milled prior to release from the solid release layer a continuous belt is also advantageous since the metal droplets may be milled downstream of the jet head nozzles whilst still on the belt, solidified and then released from the solid release layer further downstream. A continuous belt allows the process of the invention to be carried out in a continuous manner with the resultant benefits in terms of production time and cost.

In one preferred aspect, when the molten metal droplets are ejected vertically downwards, the solid release layer moves horizontally. Preferably the solid release layer moves at a rate of 0.1 to 3.0 metres/sec, such as at least 1.0 metres/sec, or at least 1.5 metres/sec. In a preferred aspect the solid release layer moves at a rate of about 1.5 metres/sec.

In a further embodiment, a thin layer of a high boiling recovery liquid, such as a silicone oil, may be passed across the surface of the solid release layer, which may itself be mobile or static.

According to this first embodiment, process (a) preferably further comprises the step of releasing the metal flakes from the solid release layer. This may be achieved by mechanical means, such as use of a doctor blade or ultrasonics, by washing the solid release layer with a recovery liquid optionally at high pressure, by applying a jet of gas such as air or an inert gas to the solid release layer, or by dissolving the release layer as previously described. A combination of these techniques may also be used.

Thus, in one aspect the metal flakes are released from the solid release layer by washing with a recovery liquid. At first sight, water appears to be a satisfactory recovery liquid. It is readily available, inexpensive and non-flammable. However, a difficulty may arise in the case of the more reactive metals, especially aluminium, which is the most widely used of all metal pigments. Finely divided aluminium metal may react with water to form aluminium oxide and hydrogen gas and the pigmentary properties of the metal flake are impaired. If water is to be used as a recovery liquid for reactive metal flakes, one or more well-known passivating agents may be required, dissolved or dispersed in the water.

As an alternative to water, an organic liquid may be used, providing it too does not adversely react with the metal being processed. Use of a liquid compatible with the envisaged application, for example a surface coating, is particularly cost-effective. To avoid ignition of the organic recovery liquid, it may be necessary to hold the recovery apparatus in an atmosphere of inert gas, such as nitrogen, or under at least a partial vacuum.

In one embodiment the liquid collecting substrates described herein may be used as recovery liquids.

Process (b)

According to a second embodiment the present invention provides a process of preparing metal flakes, the process comprising the steps of ejecting molten metal from a jet head and collecting droplets of metal in the form of metal particulates in or on a collecting substrate and subsequently milling the metal particulates to provide metal flakes.

This second embodiment may advantageously be used to prepare metal particulates having a low median particle diameter and/or a narrow particle size distribution. Such metal particulates form desirable, substantially monodisperse metal flakes.

The collecting substrate of process (b) may be a solid or a liquid. Preferably the collecting substrate is a liquid. Examples of suitable liquid collecting substrates include water, aliphatic and aromatic hydrocarbons, such as white spirit; alcohols, ketones, esters and simple and complex glycol ethers and esters. Particular examples of suitable liquid collecting substrates include medium or high boiling point mineral oils, high boiling point glycol ethers such as dipropylene glycol propyl ether, dipropylene glycol butyl ether, tripropylene glycol methyl ether, tripropylene glycol propyl ether and tripropylene glycol butyl ether.

Organic liquids are particularly suitable as collecting substrates, in particular white spirit, mineral oil having a boiling point above 150° C. or propylene glycol ether having a boiling point above 150° C. It is advantageous to use a liquid collecting substrate that is compatible with the envisaged application, for example a surface coating, since the metal particulates may often be safely milled directly in the liquid collecting substrate.

When the collecting substrate is a liquid, the metal particulates are typically metal spheres.

When the collecting substrate is a liquid, process (b) preferably comprises the step of concentrating the metal particulates by at least partial removal of the liquid collecting substrate prior to milling.

When the collecting substrate is a solid, it is preferably a solid release layer as described herein.

As previously explained, rapid cooling takes place as the droplets of metal leave the jet head. According to process (b) of the present invention, the distance between the jet head and the collecting substrate is selected such that the droplets of metal are substantially solid when they reach the collecting substrate. The distance may be as long as is convenient to convey the metal droplets to the collecting substrate. Various factors need to be taken in to account in order to select an appropriate distance. These factors include the nature of the metal, the molten metal temperature in relation to its melting point, the droplet size, the collecting substrate temperature and the atmospheric temperature in the region of the jet head.

In a preferred aspect, the distance between the jet head and the collecting substrate in process (b) is at least 0.20 metres, such as at least 0.25 metres or at least 0.30 metres.

In one preferred aspect, the distance between the jet head and the collecting substrate in process (b) is from 1 to 10 metres.

According to one embodiment molten metal is ejected from the jet head, optionally under pressure, at the top of a tall chamber filled with air or an inert gas, or held under a partial vacuum. As the molten metal falls under gravity, it cools to a solid, such that at the base of the chamber, it falls into a liquid collecting substrate. The resultant metal particulates may be collected and removed at the conclusion of this step. Alternatively, they may be continuously removed from the chamber in the liquid stream, separated, for example in a filter press, and the liquid collecting substrate recycled back into the chamber, whilst continuing to generate fresh metal particulates. In either case the metal particulates of narrow particle size distribution are converted into metal flakes of a narrow particle size distribution by milling.

In order to limit the height of the chamber that is required, any gas used may be chilled and/or directed vertically upwards within the chamber, though care must be taken to ensure that adjacent molten droplets do not impinge on each other to form aggregates. Such aggregates will significantly change the virtually monodisperse nature of the powder particle size distribution. Additionally, it may be preferable to employ inert gas, rather than air, in the chamber to limit or avoid oxidation of the metal particulates. Such oxidation can be deleterious to colouristic performance when the metal particulates are converted into metal flakes that are used in a flake pigment.

Milling

As previously mentioned, process (b) includes the step of milling the metal particulates to provide metal flakes. However milling may also be carried out in process (a).

The term "milling" as used herein includes any mechanical work performed on the particulates by moving milling media, for instance, by conventional ball milling, and alternatively, by roll milling, such as with a nip roll.

Milling may be by a dry process or a wet process, for example in a ball mill. If a wet process is used, it may be advantageous from a cost perspective to mill the metal particulates or metal flakes whilst they are still in either a liquid collecting substrate or a recovery liquid.

Although the physical form of the metal flakes obtained from process (a) is good and they are suitable for use as pigment without further processing, for maximum brightness they may be gently milled or polished to increase surface reflectance.

As part of process (a), milling may be carried out before or after the metal flakes are released from the solid release layer. For example, the still molten metal droplets may be allowed to impinge directly on the moving rolls of a two or three roll mill whilst still on the solid release layer. When the droplets have solidified into metal flakes these may then be released from the solid release layer in the manner previously described.

The nip between the rolls is set to impart pressure on the droplets or flakes, forcing them to assume the contours of the rolls. The surface quality and hence the reflectivity of the resulting metal flakes is critically dependent on the degree of surface polish of the rolls. It is an advantage of this process that as the molten metal droplets are being uniformly generated in space and time, no overlap or cold welding of particles should take place, providing the rolls are rotating at a suitable speed.

Further Treatment

As previously mentioned, the metal flakes prepared according to process (a) may be released from the solid release layer by washing with a recovery liquid. A further advantage of the process of the present invention is the ability to treat the metal flakes whilst in the recovery liquid. Similarly, the metal particulates prepared according to process (b) may be collected in a liquid collecting substrate and milled to provide metal flakes. The metal flakes may then be further treated whilst still in the liquid collecting substrate. Alternatively dry metal flakes prepared by the process of the invention may be added to a suitable liquid for further processing.

The metal flakes in a recovery liquid, a liquid collecting substrate or another suitable liquid may be treated for a variety of purposes. For example, the metal flakes may optionally be treated with ammonium dichromate, or coated with silica or alumina, to improve stability in aqueous application media. Other treatments may be used to provide coloration of the flake surface, for example to simulate gold. Still further treatments may improve the hardness and therefore the shear resistance of such flakes in application media.

In some circumstances it may be desirable to passivate the metal flakes. This may be particularly desirable when the metal flakes are to be added to surface coating binders dissolved or dispersed in water, solvent or mixtures of the two, to prepare a surface coating, such as an ink or paint. The reaction of certain metal flakes, notably aluminium flakes, is unpredictable. Where such a surface coating contains a proportion of water, there exists the possibility that reactions may occur during storage, with the formation of hydrogen gas with the aforementioned hazards.

Passivation of the metal flakes may be achieved through the addition of one or more corrosion inhibiting agents to the recovery liquid, the liquid collecting substrate or another suitable liquid at any suitable point during preparation of the metal flakes.

Any compounds capable of inhibiting the reaction of the metal with water may be employed as corrosion inhibitors. Examples are phosphorus-, chromium-, vanadium-, titanium- or silicon-containing compounds. They may be used individually or in admixture.

For certain applications, it may be necessary to concentrate the metal flakes either in the recovery liquid or in the liquid collecting substrate, for example to form a conventional metal flake pigment paste. Where this is the case, a filter press or other well-known means of separating solid particulates from liquid may be employed. To render the product of the process of the invention compatible with plastics and certain printing inks, it is preferable to avoid a processing liquid, either by dry recovery of the metal flakes or through their conversion into a liquid free form, such as granules, using for example the process described in European Patent 0134676.

Metal Flakes

The process of the present invention may advantageously be used to produce metal flakes having low median particle diameters and/or narrow particle size distribution. The metal flakes may have functional as well as aesthetic applications.

Metal flakes obtained or obtainable by the present invention may be used to produce surface coatings with desirable properties. Thus in one aspect, the present invention provides a surface coating comprising metal flakes obtainable by the process of the present invention. The surface coating may be for example an ink, a paint or a powder coating.

Metal flakes obtained or obtainable by the present invention may also be used as a metal pigment, for instance in a composition comprising the metal flakes and at least one liquid dispersant or in a liquid free form such as granules comprising the metal flakes and at least one solid organic carrier material.

Metal flakes for incorporation in the metal pigment of the present invention may advantageously be prepared according to the process of the present invention.

In addition to metal flakes having a substantially circular face, it is possible to produce other shapes such as squares, triangles and rods or bars using the processes of the present invention. Such shapes may be useful as metal pigments, in which case the foregoing limitations and preferences for particle size and particle size distribution will apply. However metal particles of spherical, cylindrical or other shapes may have further applications; for instance metal rods or bars printed by the processes of the present invention are useful in conductors or conducting coatings. Such rods or bars preferably have a width of 2 μm or more and a length of less than about 1000 μm (1 mm). They may be used not only for their reflectance properties but also for their conductivity for example in electrically conductive applications, such as EMI shielding. Such rods or bars may be prepared by reducing the speed of the moving substrate such that the jetted molten droplets partially overlap to form the desired shapes directly. Alternatively, they may be deposited as continuous strips, which are subsequently recovered and comminuted to rods or bars.

Metal Pigment

In a further aspect, the present invention provides a metal pigment comprising metal flakes having a median particle diameter of 100 μm or less and a particle size distribution such that at least 90% by volume of the metal flakes have a particle diameter within ±25% of the median particle diameter.

The term "median particle diameter" as used herein refers to a volume median particle diameter.

Particle size distributions are measured with a "Malvern Master Sizer X" which is a standard instrument for measuring volume percent particle size distributions.

In a broad aspect, the present invention provides a metal pigment comprising metal flakes having a median particle diameter of 200 μm or less, preferably 150 μm or less and a particle size distribution such that at least 90% by volume of the metal flakes have a particle diameter within ±25% of the median particle diameter.

Preferably the metal flakes have a median particle diameter of 50 μm or less, such as 30 μm or less.

If the metal pigment is to be used in a surface coating it is preferable that the metal flakes have a median particle diameter of 50 μm or less, for instance 30 μm or less, for example in the range 5 to 25 μm. If the metal pigment is to be used in an ink it is preferable that the metal flakes have a median particle diameter of 30 μm or less, for instance 20 μm or less, for example in the range 5 to 15 μm.

In one aspect the metal flakes have a median particle diameter of 2 μm or more, such as 3 μm or more, or 5 μm or more.

Preferably the metal flakes have a median particle diameter in the range 2 to 50 μm, preferably 5 to 30 μm, more preferably 5 to 25 μm.

Preferably the metal flakes have a particle size distribution such that at least 95% by volume of the metal flakes have a particle diameter within ±25% of the median particle diameter, such as within ±20%, or ±15%, or ±10%, or ±5%.

In one preferred embodiment, the metal flakes have a particle size distribution such that at least 95% by volume of the metal flakes have a particle diameter within ±3% of the median particle diameter.

The aspect ratio of the flakes is preferably at least 15:1. More preferably the aspect ratio is from about 30:1 to about 100:1. Higher aspect ratios are generally preferable and particles having an aspect ratio of 150:1 or above may be obtained by the present invention. The aspect ratio is defined at the ratio of the largest dimension to the smallest dimension. In a preferred aspect the metal flakes have a substantially circular face.

Apparatus

In one aspect the present invention provides an apparatus for producing metal flakes, the apparatus comprising (i) a jet head comprising at least one nozzle; and (ii) a collecting substrate arranged to collect molten metal droplets ejected from the jet head characterised in that the collecting substrate is a solid release layer.

Jet heads of the continuous ink jet (CIJ) and drop-on-demand (DOD) types are especially amenable to the process and apparatus of the invention, provided that the piezoelectric control of the latter is kept well insulated and so well below the temperature of the molten metal. A plurality of nozzles is desirable in order to prepare commercial quantities in a reasonable timescale. A filter for the molten metal before it enters the nozzles is also advantageous. For example, a filter may be desirable to avoid blocking the nozzle(s) if there are impurities, such as oxide or slag, in the molten metal.

Preferably at least the jet head and the solid release layer are in a chamber under an inert atmosphere, or under at least a partial vacuum.

As mentioned above, a suitable solid release layer is PTFE, silicon, polished glass or polished ceramic. In a preferred aspect the solid release layer is or is on a continuous belt.

Preferably the distance between the jet head and the collecting substrate is less than 0.30 metres, such as less than 0.25 metres or less than 0.20 metres. More preferably the distance between the jet head and the collecting substrate is from 0.001 to 0.01 metres.

The invention is further illustrated by the following Examples in which all parts and percentages are by weight.

EXAMPLES

Example 1

Metallic tin was melted in the reservoir of a jet head, fabricated mainly from stainless steel and having 120 circular nozzles, each of 35 μm diameter, drilled in a 75 mm diameter, 380 μm thick silicon wafer attached thereto. At an operating frequency of 4,000 Hz, the molten tin droplets were allowed to fall 0.7 cm onto a PTFE belt, moving horizontally at 0.45 metres/sec. Solidified tin flakes were continuously removed from the belt after the deposition station by washing with a fan jet of mineral spirits in an atmosphere of nitrogen. The thus collected flakes were concentrated in a filter press to give a metal pigment paste having a solids content of 90% by weight. A solvent-based paint prepared from the metal pigment paste demonstrated excellent brightness and a silver tone with a very pale gold tinge.

Example 2

Metallic tin was melted in the reservoir of a jet head. At an operating frequency of 3,000 Hz and with 40 psi pressure of nitrogen gas, the molten tin was forced through multiple 20 μm nozzle orifices vertically downwards from the top of a 2.5 m high column, inerted by nitrogen gas. Solidified tin spheres were allowed to fall into a shallow mass of white spirits solvent at the base of the column. The thus collected powder was concentrated in a filter press to give a filter cake having a solids content of approximately 90% by weight. The variation in diameter of the collected material was a maximum of only +/−4%.

33.0 kg of the thus prepared filter cake,
0.5 kg oleic acid and
50.0 kg white spirits were milled in a ball mill with 450 kg of 3.5 mm diameter steel balls for 3 hours. The flake pigment obtained was removed from the mill by washing with further white spirit and collected in a filter press. The variation in diameter of the material, collected in virtually quantitative yield was less than 5%.

A solvent-based paint prepared from the resulting metal flake pigment paste demonstrated outstanding brightness and a silver tone with a very pale gold tinge.

Example 3

A jet print head is constructed to demonstrate the concept. The print head includes an integrally fitted reservoir for the molten metal that is machined from molybenum. Sealing to the top and bottom plates is by means of flexible graphite gaskets. Heating of the metal is by an electrical resistance unit with an integral thermocouple formed into a spiral to fit tightly outside the reservoir. The bottom plate is a ceramic disc with a 1 mm hole in the centre. A laser drilled ruby nozzle with a diameter of 20 μm is cemented into the centre of this disc. A molybdenum piezoelectric driven ruby diaphragm bonded to a ceramic forms the top plate of the reservoir. Insulation is fitted between the reservoir heater and the top and bottom plates of the print head. The molten aluminium is passed through a ceramic filter before entering the print head reservoir.

Examples 1 and 2 are repeated using this jet print head.

TABLE 1

| Size (μm) | Vol Under % |
| --- | --- |
| 0.020 | 0.00 |
| 0.022 | 0.00 |
| 0.025 | 0.00 |
| 0.028 | 0.00 |
| 0.032 | 0.00 |
| 0.036 | 0.00 |
| 0.040 | 0.00 |
| 0.045 | 0.00 |
| 0.050 | 0.00 |
| 0.056 | 0.00 |
| 0.063 | 0.00 |
| 0.071 | 0.00 |
| 0.080 | 0.00 |
| 0.089 | 0.00 |
| 0.100 | 0.00 |
| 0.113 | 0.00 |
| 0.126 | 0.00 |
| 0.142 | 0.00 |
| 0.159 | 0.00 |
| 0.178 | 0.00 |
| 0.200 | 0.00 |
| 0.224 | 0.00 |
| 0.252 | 0.00 |
| 0.282 | 0.00 |
| 0.317 | 0.00 |
| 0.358 | 0.00 |
| 0.399 | 0.00 |
| 0.448 | 0.00 |
| 0.502 | 0.00 |
| 0.564 | 0.00 |
| 0.632 | 0.00 |
| 0.710 | 0.00 |
| 0.796 | 0.00 |
| 0.893 | 0.00 |
| 1.002 | 0.00 |
| 1.125 | 0.00 |
| 1.262 | 0.00 |
| 1.416 | 0.00 |
| 1.589 | 0.00 |
| 1.783 | 0.00 |
| 2.000 | 0.00 |
| 2.244 | 0.00 |
| 2.518 | 0.00 |
| 2.825 | 0.00 |
| 3.170 | 0.03 |
| 3.557 | 0.10 |
| 3.990 | 0.22 |
| 4.477 | 0.40 |
| 5.024 | 0.65 |
| 5.637 | 0.99 |
| 6.325 | 1.45 |
| 7.096 | 2.04 |
| 7.962 | 2.78 |
| 8.934 | 3.70 |
| 10.024 | 4.62 |
| 11.247 | 6.16 |
| 12.619 | 7.77 |
| 14.159 | 9.68 |
| 15.887 | 11.95 |
| 17.825 | 14.66 |
| 20.000 | 17.88 |
| 22.440 | 21.68 |
| 25.179 | 26.14 |
| 28.251 | 31.28 |
| 31.696 | 37.09 |
| 35.566 | 43.52 |
| 39.905 | 50.43 |
| 44.774 | 57.64 |
| 50.238 | 64.91 |
| 56.368 | 71.98 |
| 63.246 | 78.58 |
| 70.963 | 84.46 |
| 79.621 | 89.45 |
| 89.337 | 93.42 |
| 100.237 | 96.35 |
| 112.468 | 98.32 |
| 126.192 | 99.44 |
| 141.589 | 99.93 |
| 158.666 | 100.00 |
| 178.250 | 100.00 |
| 200.000 | 100.00 |
| 224.404 | 100.00 |
| 251.785 | 100.00 |
| 282.507 | 100.00 |
| 316.979 | 100.00 |
| 355.658 | 100.00 |
| 399.053 | 100.00 |
| 447.744 | 100.00 |
| 502.377 | 100.00 |
| 563.677 | 100.00 |
| 632.458 | 100.00 |
| 709.627 | 100.00 |
| 798.214 | 100.00 |
| 893.387 | 100.00 |
| 1002.375 | 100.00 |
| 1124.683 | 100.00 |
| 1261.915 | 100.00 |
| 1415.892 | 100.00 |
| 1588.657 | 100.00 |
| 1782.502 | 100.00 |
| 2000.000 | 100.00 |

The invention claimed is:

1. A jetting process comprising the steps of ejecting molten metal from a jet head, wherein the molten metal is in the form of droplets which are induced to part reliably and uniformly on egress from the entrance of one or more nozzles with a piezoelectric control and with the molten metal passing through a filter before it enters the nozzle or nozzles, and either:
   (a) collecting droplets of metal on a collecting substrate, wherein the collecting substrate comprises a solid release layer; or
   (b) collecting droplets of metal in or on a collecting substrate and subsequently milling the collected metal droplets.

2. A process according to claim 1, wherein the metal is selected from aluminium, zinc, copper, tin, nickel, silver, gold, iron and alloys thereof.

3. A process according to claim 1, wherein the molten metal is ejected vertically downwards.

4. A process according to claim 1, wherein the jet head and the collecting substrate are in a chamber under an inert atmosphere, or under at least a partial vacuum.

5. A process according to claim 1, wherein the distance between the jet head and the collecting substrate in process (a) is less than 0.25 meters.

6. A process according to claim 5, wherein the distance between the jet head and the collecting substrate in process (a) is from 0.001 to 0.01 meters.

7. A process according to claim 1, wherein the solid release layer has a low friction coefficient.

8. A process according to claim 1, wherein the solid release layer is PTFE, silicon, polished glass or polished ceramic.

9. A process according to claim 1, wherein the solid release layer is or is on a continuous belt.

10. A process according to claim 1, wherein the distance between the jet head and the collecting substrate in process (b) is at least 0.25 meters.

11. A process according to claim 10, wherein the distance between the jet head and the collecting substrate in process (b) is from 1 to 10 meters.

12. A process according to claim 1, wherein the collecting substrate in process (b) is a liquid.

13. A process according to claim 1, wherein the collecting substrate in process (b) is a solid.

14. A process according to claim 1 wherein the jet head comprises at least one nozzle.

15. A process according to claim 1, wherein the metal is selected from aluminium, zinc, copper, tin, nickel, silver, gold, iron and alloys thereof, the molten metal is ejected vertically downwards, the distance between the jet head and the collecting substrate in process (a) is from 0.001 to 0.01 m, the solid release layer is PTFE, silicon, polished glass or polished ceramic, and the solid release layer is or is on a continuous belt.

16. A process of preparing flattened metal particulates, the process comprising the steps of ejecting molten metal from a jet head, wherein the molten metal is in the form of droplets which are induced to part reliably and uniformly on egress from the entrance of one or more nozzles with a piezoelectric control and with the molten metal passing through a filter before it enters the nozzle or nozzles, and either:
   (a) collecting droplets of metal in the form of metal flakes on a collecting substrate, wherein the collecting substrate comprises a solid release layer; or
   (b) collecting droplets of metal in the form of metal particulates in or on a collecting substrate; and subsequently treating the metal particulates to provide flattened metal particulates.

17. A process according to claim 16 wherein process (b) comprises collecting droplets of metal in the form of metal particulates in or on a collecting substrate; and subsequently milling the metal particulates to provide metal flakes.

18. A process according to claim 16, wherein process (a) further comprises the step of releasing the metal flakes from the solid release layer either by mechanical means and/or by washing with a recovery liquid.

19. A process according to claim 16, wherein the flattened metal particulates are metal flakes, and the process further comprises processing the metal flakes into a metal pigment.

20. A process according to claim 19, which further comprises processing the metal pigment into a surface coating, such as an ink, a paint or a powder coating.

21. A process according to claim 19 wherein the metal flakes have a median particle diameter of 100 μm or less and a particle size distribution such that at least 90% by volume of the metal flakes have a particle diameter within ±25% of the median particle diameter.

22. A process according to claim 21 wherein the metal flakes have a median particle diameter of 50 μm or less.

23. A process according to claim 21 wherein the metal flakes have a median particle diameter of 30 μm or less.

24. A process according to claim 21 wherein the metal flakes have a particle size distribution such that at least 95% by volume of the metal flakes have a particle diameter within ±25% of the median particle diameter.

25. A process according to claim 21 wherein the metal flakes have a particle size distribution such that at least 95% by volume of the metal flakes have a particle diameter within ±3% of the median particle diameter.

26. A process according to claim 16, wherein the metal is selected from aluminium, zinc, copper, tin, nickel, silver, gold, iron and alloys thereof.

27. A process according to claim 16, wherein the molten metal is ejected vertically downwards.

28. A process according to claim 16, wherein the jet head and the collecting substrate are in a chamber under an inert atmosphere, or under at least a partial vacuum.

29. A process according to claim 16, wherein the distance between the jet head and the collecting substrate in process (a) is less than 0.25 meters.

30. A process according to claim 29, wherein the distance between the jet head and the collecting substrate in process (a) is from 0.001 to 0.01 meters.

31. A process according to claim 16, wherein the solid release layer has a low friction coefficient.

32. A process according to claim 16, wherein the solid release layer is PTFE, silicon, polished glass or polished ceramic.

33. A process according to claim 16, wherein the solid release layer is or is on a continuous belt.

34. A process according to claim 16, wherein the distance between the jet head and the collecting substrate in process (b) is at least 0.25 meters.

35. A process according to claim 34, wherein the distance between the jet head and the collecting substrate in process (b) is from 1 to 10 meters.

36. A process according to claim 16, wherein the collecting substrate in process (b) is a liquid.

37. A process according to claim 16, wherein the collecting substrate in process (b) is a solid.

38. A process according to claim 16, wherein the metal is selected from aluminium, zinc, copper, tin, nickel, silver, gold, iron and alloys thereof, the molten metal is ejected vertically downwards, the jet head and the collecting substrate are in a chamber under an inert atmosphere, or under at least a partial vacuum, the distance between the jet head and the collecting substrate in process (b) is from 1 to 10 meters, the collecting substrate in process (b) is white spirit, mineral oil having a boiling point above 150° C. or propylene glycol ether having a boiling point above 150° C.

39. A process according to claim 16, wherein the flattened metal particulate products are flakes, and the process further comprises treating or coating the flakes (i) with ammonium dichromate (ii) with silica or alumina, (iii) to provide colouration of the flake surface, (iv) to improve the hardness and therefore the shear resistance of such flakes in application media, or (v) to passivate the metal flakes.

* * * * *